US009210184B2

(12) United States Patent
Hay et al.

(10) Patent No.: US 9,210,184 B2
(45) Date of Patent: Dec. 8, 2015

(54) DETERMINING THE VULNERABILITY OF COMPUTER SOFTWARE APPLICATIONS TO ATTACKS

(75) Inventors: Roee Hay, Haifa (IL); Roi Saltzman, Rishon Le Zion (IL); Adi Sharabani, Ramat Gan (IL); Omer Tripp, Har-Adar (IL)

(73) Assignee: International Business Machines Corporation, Armonk, NY (US)

( * ) Notice: Subject to any disclaimer, the term of this patent is extended or adjusted under 35 U.S.C. 154(b) by 688 days.

(21) Appl. No.: 12/648,445

(22) Filed: Dec. 29, 2009

(65) Prior Publication Data

US 2011/0162072 A1 Jun. 30, 2011

(51) Int. Cl.
  G06F 11/00 (2006.01)
  H04L 29/06 (2006.01)
  G06F 21/57 (2013.01)
  H04L 29/08 (2006.01)

(52) U.S. Cl.
  CPC .......... *H04L 63/1433* (2013.01); *G06F 21/577* (2013.01); *H04L 63/1483* (2013.01); *H04L 67/02* (2013.01)

(58) Field of Classification Search
  CPC ... G06F 21/57; G06F 21/577; H04L 63/1483; H04L 63/1433; H04L 63/1441
  USPC ...................................................... 726/22, 25
  See application file for complete search history.

(56) References Cited

U.S. PATENT DOCUMENTS 7,343,626 B1 * 3/2008 Gallagher ....................... 726/25

2003/0051142 A1 * 3/2003 Hidalgo et al. ............... 713/176
2007/0107057 A1   5/2007 Chander et al.
2008/0172382 A1 * 7/2008 Prettejohn ........................ 707/6

FOREIGN PATENT DOCUMENTS

WO 2008002350 A1 1/2008
WO 2008047351 A2 4/2008

OTHER PUBLICATIONS

Augmenting Branch Predictor to Secure Program Execution, Yixin et al, IEEE 2007.*
Architectural Support for Run-Time Validation of Control Flow Transfer, Yixin et al, IEEE 2007.*

* cited by examiner

*Primary Examiner* — Luu Pham
*Assistant Examiner* — Jahangir Kabir
(74) *Attorney, Agent, or Firm* — Holland & Knight LLP; Brian J. Colandreo, Esq.; Jeffrey T. Placker, Esq.

(57) ABSTRACT

Determining the vulnerability of computer software applications to attacks by identifying a defense-related variable within a computer software application that is assigned results of a defense operation defending against a predefined type of attack, identifying a control-flow predicate dominating a security-sensitive operation within the application, identifying a data-flow dependent variable in the application that is data-flow dependent on the defense-related variable, determining whether the control-flow predicate uses the data-flow dependent variable to make a branching decision and whether a control-flow path leading to the security-sensitive operation is taken only if the data-flow dependent variable is compared against a value of a predefined type, determining that the security-sensitive operation is safe from the attack if both control-flow conditions are true, and determining that the application is safe from the attack if all security-sensitive operations in the application are determined to be safe from the attack.

24 Claims, 3 Drawing Sheets

DETERMINING THE VULNERABILITY OF COMPUTER SOFTWARE APPLICATIONS TO ATTACKS

FIELD OF THE INVENTION

The present invention relates to computer software security in general, and more particularly to determining the vulnerability of computer software applications to attacks.

BACKGROUND OF THE INVENTION

A cross-site request forgery (CSRF) attack is a type of malicious exploit which, in one common form, causes a user's browser, when browsing a website containing malicious code, to send an unauthorized command to a target website which has a trust relationship with the user, such as the user's online banking website. For example, a user may browse a website containing the following malicious code:
<img src="http://www.usersbank.com/withdraw?account=bob&amount=100&for=mal">
which causes the user's browser to send a request to the user's online banking website to transfer money from the user's bank account to that of the attacker. Such attacks typically rely on the presence of a cookie that the target website previously stored on the user's computer and that contains confidential information, such as the user's login and password for the target site.

Websites may protect themselves and their trusted users against CSRF attacks by employing various mechanisms at the website server. In one popular anti-CSRF mechanism, when a user requests an HTML form from a website server, the server generates a token using a pseudo-random number generator, inserts the token into the HTML form as a hidden input field, and provides the HTML form to the user. The server also provides the user with another copy of the token to be stored in a cookie at the user's computer. Preferably, the tokens that are provided to the user are encrypted using different encryption algorithms. When the user submits the HTML form to the website server, the form is submitted together with its hidden token, and the token from the cookie is submitted as well. The server checks if the token submitted with the form matches the token stored in the cookie. If the tokens match, then the submission is considered by the server as not the result of a CSRF attack on the assumption that there is a very low probability that an attacker could create a version of the HTML form with the proper token.

While server-based anti-CSRF mechanisms exist, it is the responsibility of the website developer to use them properly and test whether a website is adequately protected against CSRF attacks.

SUMMARY OF THE INVENTION

In one aspect of the invention a system is provided for determining the vulnerability of computer software applications to attacks, the system including a variable identifier configured to identify a defense-related variable within a computer software application that is assigned results of a defense operation, where the defense operation is configured to defend against a predefined type of attack, and a vulnerability identifier configured to identify a control-flow predicate dominating a security-sensitive operation within the computer software application, where the security-sensitive operation is security-sensitive with respect to the predefined type of attack, identify a data-flow dependent variable in the computer software application that is data-flow dependent on the defense-related variable, determine that a first condition is true if the control-flow predicate uses the data-flow dependent variable to make a branching decision, determine that a second condition is true if a control-flow path leading to the security-sensitive operation is taken only if the data-flow dependent variable is compared against a value of a predefined type, determine that the security-sensitive operation is safe from the predefined type of attack if both of the conditions are true, and determine that the computer software application is safe from the predefined type of attack if all security-sensitive operations in the computer software application are determined to be safe from the predefined type of attack. Methods and computer program products therefor are also provided.

BRIEF DESCRIPTION OF THE DRAWINGS

The invention will be understood and appreciated more fully from the following detailed description taken in conjunction with the appended drawings in which.

DETAILED DESCRIPTION OF THE INVENTION

Figure 1:
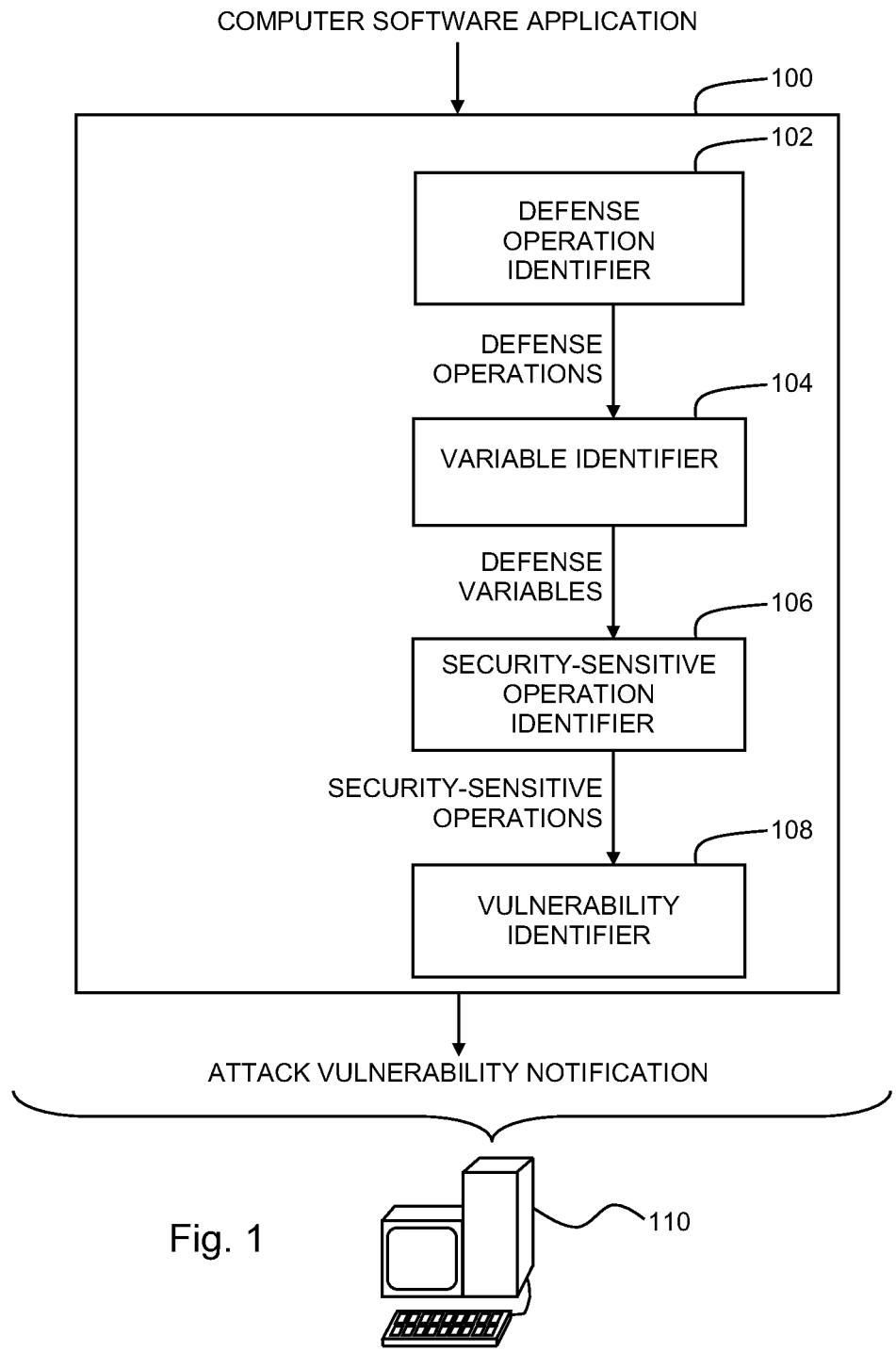
FIG. 1 is a simplified conceptual illustration of a system for determining vulnerability of computer software applications to attacks, constructed and operative in accordance with an embodiment of the invention.

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1 which is a simplified conceptual illustration of a system for determining vulnerability of computer software applications to attacks, such as cross-site request forgery attacks, constructed and operative in accordance with an embodiment of the invention. In the system of FIG. 1, a static analyzer 100 is provided for statically analyzing the instructions of a computer software application, such as an Internet-based website application where the instructions are in the form of source code or bytecode. Static analyzer 100 preferably includes a defense operation identifier 102 that is configured to scan the computer software application to identify defense operations, such as in the form of methods, procedures, or individual instructions that are responsible for defending against a specified type of attack, such as against cross-site request forgery attacks by generating anti-CSRF tokens. Defense operation identifier 102 preferably identifies such defense operations using conventional techniques, and/or such defense operations may be manually identified and made known to defense operation identifier 102. Static analyzer 100 also preferably includes a variable identifier 104 that is configured to identify any variables V within the application that are assigned results of the identified defense operations, such as variables that receive anti-CSRF token values. Static analyzer 100 also preferably includes a security-sensitive operation identifier 106 that is configured to scan the computer software application to identify security-sensitive operations that are determined to be security-sensitive with respect to the specified type of attack. Security-sensitive operation identifier 106 preferably identifies such security-sensitive operations using conventional techniques, and/or such security-sensitive operations may be manually identified and made known to security-sensitive operation identifier 106. Static analyzer 100 also preferably includes a vulnerability identifier 108 that for each security-sensitive operation o in the set O of the identified security-sensitive operations identifies a set C of control-flow predicates dominating o,
    identifies, using conventional forward slicing techniques, a set FD of variables that are data-flow dependent on any of the variables in V, where forward slicing is preferably performed from each statement where a variable in V is assigned a value by virtue of a call to an identified defense operation, such as an anti-CSRF token generator,
    for each control-flow predicate c in C, determines if the following two conditions are true:
        if c uses a value v from FD to make a branching decision, and, if so,
        if a control-flow path leading to the security-sensitive operation o is taken only if v is compared against a value of a predefined type that is received from a source external to the application (e.g., the value of a query string or any part of it, the value of a given HTTP parameter (POST or GET), or the value of a given HTTP header). Preferably, the control flow path leads from an entry point into the application, such as via a doGet( ) method in a Java servlet method that is called by a Web application container in response to a Web request.

If both of the above conditions are true for at least one unique control-flow path to o, then o is determined to be safe from the specified type of attack. Otherwise, is determined to be vulnerable to the specified type of attack. If all o in O is determined to be safe from the specified type of attack, then the application is determined to be safe from the specified type of attack, whereupon vulnerability identifier 108 preferably provides a notification, such as via a display of a computer 110, that the application is safe from the specified type of attack. Conversely, if any o in O is determined to be vulnerable to the specified type of attack, vulnerability identifier 108 preferably provides a notification that the application is vulnerable to the specified type of attack, preferably also identifying the vulnerable instructions and/or control flow paths within the application.

Figure 2:
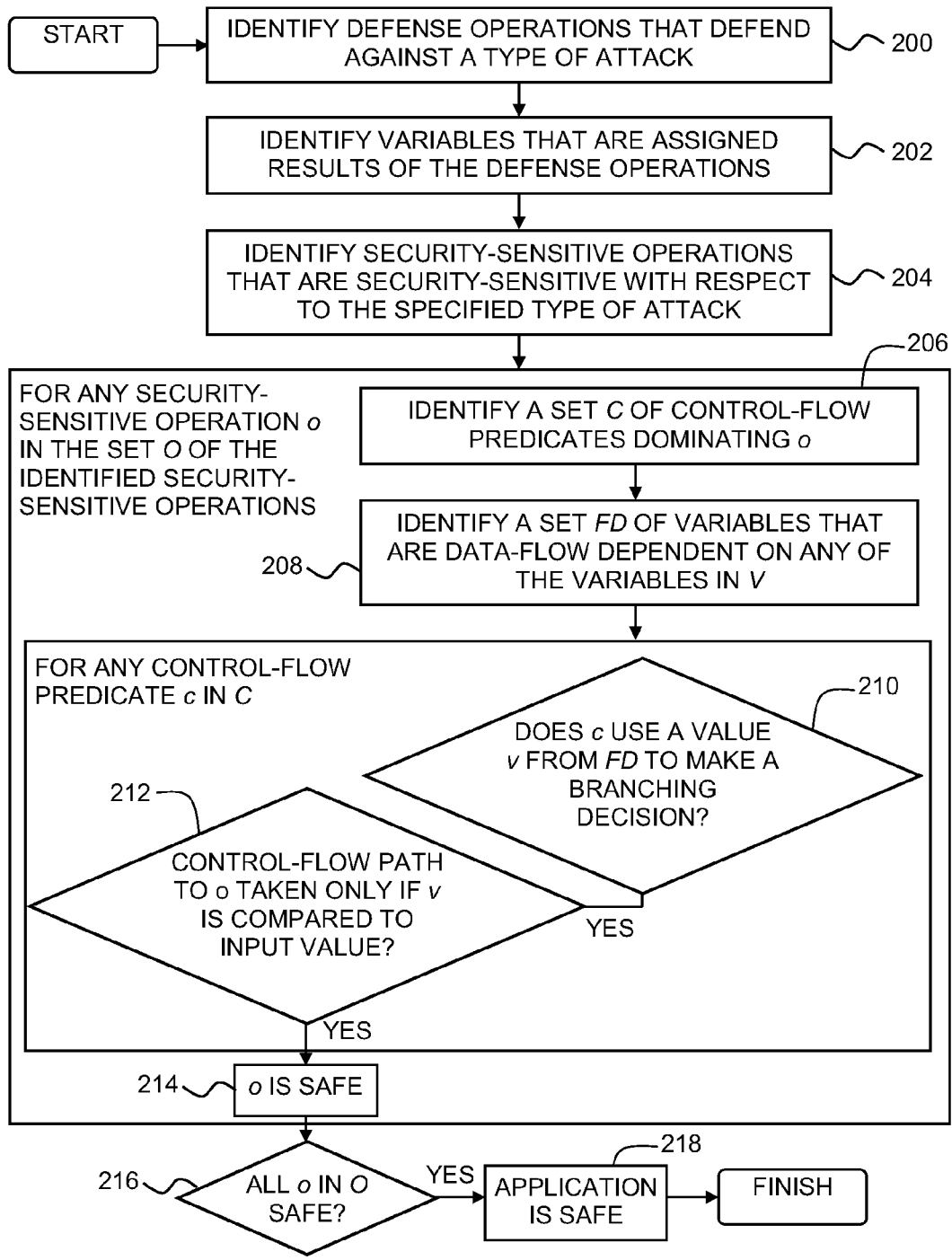
FIG. 2 is a simplified flowchart illustration of an exemplary method of operation of the system of FIG. 1, operative in accordance with an embodiment of the invention.

Reference is now made to FIG. 2, which is a simplified flowchart illustration of an exemplary method of operation of the system of FIG. 1, operative in accordance with an embodiment of the invention. In the method of FIG. 2, the instructions of a computer software application are statically analyzed to identify defense operations responsible for defending against a specified type of attack, such as against cross-site request forgery attacks by generating anti-CSRF tokens (step 200). Any variables V are identified within the application that are assigned the results of the identified defense operations, such as variables that receive anti-CSRF token values (step 202). Security-sensitive operations are identified that are determined to be security-sensitive with respect to the specified type of attack (step 204). For any security-sensitive operation o in the set O of the identified security-sensitive operations a set C is identified of control-flow predicates dominating o (step 206),
 a set FD is identified of variables that are data-flow dependent on any of the variables in V (step 208),
 for any control-flow predicate c in C
  if c uses a value v from FD to make a branching decision (step 210), and,
  if a control-flow path leading to the security-sensitive operation o is taken only if v is compared against a value of a predefined type that is received from a source external to the application (step 212),
 then o is considered to be safe with respect to the specified type of attack (step 214).

If all o in O are determined to be safe with respect to the specified type of attack (step 216), then the application itself is determined to be safe with respect to the specified type of attack (step 218).

It will be appreciated that any aspect of the invention described hereinabove may be implemented as a computer program product embodied in a computer-readable medium, such as in the form of computer program instructions stored on magnetic, optical, or other physical storage media or embedded within computer hardware, and may be executed by or otherwise accessible to computer 110 (FIG. 1).

The system and method of FIGS. 1 and 2 may be understood within the context of the following exemplary scenario in which a computer software application, such as an Internet-based website application, includes the following instructions:

```
AuthenticationServlet {
    void doGet(HttpRequest req, HttpResponse resp) {
        String username = req.getParameter("username");
        String password = req.getParameter("password");
        If (DB.isValidUser(username, password) {
            ...
            long random = PRNG.nextLong( );
            session.setValue("sessionID", random);
            renderAsHiddenInput(resp, random);
            ...
```

```
        }
    }
}
MoneyTransferServlet {
    void doGet(HttpRequest req, HttpResponse resp) {
        long requestToken =
          Long.parseLong(req.getParameter("token"));
        long sessionID = session.getValue("sessionID");
        if (requestToken == serssionID) {
            String amount = req.getParameter("howMuch");
            String from = req.getParameter("from");
            String to = req.getParameter("to");
            DB.transferMoney(to, from, amount);
        }
    }
}
```

In this example, static analysis identifies PRNG.nextLong( ) in AuthenticationServlet as being responsible for generating anti-CSRF tokens, and the variable 'random' is identified as being assigned the result of a generated anti-CSRF token. 'random' is then tracked into and out of the session object.

Static analysis also identifies 'transferMoney' in MoneyTransferServlet as being a security-sensitive operation. The set of control-flow predicates governing 'transferMoney' is determined. The variable 'sessionID' is determined as being data-flow dependent on the variable 'random'. The analysis also determines that 'sessionID' is compared against a value coming from the request ('requestToken') and that is received from a source external to the application. Since the control flow {requestToken==sessionID} uses a value 'sessionID' to make a branching decision, and, since the control-flow path leading to the security-sensitive operation 'transferMoney' is taken only if 'sessionID' is compared against a token value that is received from a source external to the application, 'transferMoney' is deemed safe. If 'transferMoney' is the only security-sensitive operation in the application, then the application is considered CSRF-safe.

Figure 3:
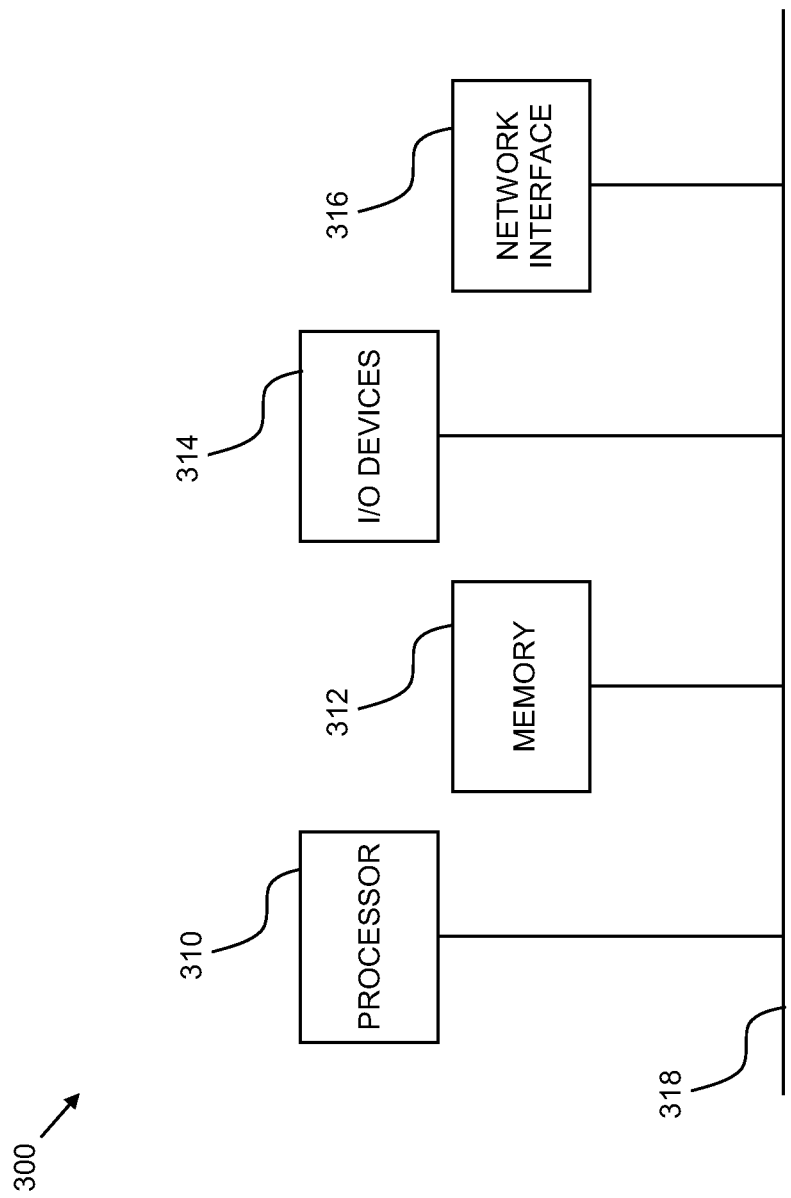
FIG. 3 is a simplified block diagram illustration of an exemplary hardware implementation of a computing system, constructed and operative in accordance with an embodiment of the invention.

Referring now to FIG. 3, block diagram 300 illustrates an exemplary hardware implementation of a computing system in accordance with which one or more components/methodologies of the invention (e.g., components/methodologies described in the context of the drawing figures shown and described herein) may be implemented, according to an embodiment of the invention.

As shown, the techniques for controlling access to at least one resource may be implemented in accordance with a processor 310, a memory 312, I/O devices 314, and a network interface 316, coupled via a computer bus 318 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A system for determining the vulnerability of computer software applications to attacks, the system comprising:
a computing device, including a memory and a processor; the memory is configured to store executable instructions; the processor is configured to execute the executable instructions to cause the processor to:
identify a defense-related variable within a computer software application that is assigned results of a defense operation, wherein said defense operation is performed to defend against a predefined type of attack;
identify a control-flow predicate dominating a security-sensitive operation within said computer software application, wherein said security-sensitive operation is security-sensitive with respect to said predefined type of attack;
identify a data-flow dependent variable defined within instructions of said computer software application that is data-flow dependent on said defense-related variable,
determine that a first condition is true in response to a verification that said control-flow predicate uses said data-flow dependent variable to make a branching decision,
determine that the first condition is false in response to a verification that said control-flow predicate does not use said data-flow dependent variable to make the branching decision;
determine that a second condition is true in response to a verification that a control-flow path leading to said security-sensitive operation is taken only as a result of said data-flow dependent variable is being compared against a value of a predefined type, that is received from a source external to said computer software application;
determine that the second condition is false in response to a verification that the control-flow path leading to said security-sensitive operation is not taken only as the result of said data-flow dependent variable being compared against the value of the predefined type that is received from the source external to said computer software application;
determine that said security-sensitive operation is safe from said predefined type of attack in response to a verification that both of said conditions are true, and
determine that said computer software application is safe from said predefined type of attack in response to a verification that both of said conditions are true for all security-sensitive operations in said computer software application.

2. The system according to claim 1 wherein said predefined type of attack is a cross-site request forgery attack.

3. The system according to claim 1 wherein the processor is configured to provide a notification that said computer software application is safe from said predefined type of attack.

4. The system according to claim 1 wherein the processor is configured to provide a notification that said computer software application is not safe from said predefined type of attack if said vulnerability identifier determines that fewer than both of said conditions are true regarding said security-sensitive operation.

5. The system according to claim 4 wherein the processor is configured to provide a notification identifying said security-sensitive operation regarding which fewer than both of said conditions are true.

6. The system according to claim 1 and further comprising the processor is configured to identify said defense operation within said computer software application.

7. The system according to claim 1 and further comprising the processor is configured to identify said security-sensitive operation within said computer software application.

8. The system according to claim 1 wherein the processor is configured to determine that said second condition is true where said predefined type is the value of a query string or any part of said query string.

9. The system according to claim 1 wherein the processor is configured to determine that said second condition is true where said predefined type is the value of an HTTP POST or GET parameter.

10. The system according to claim 1 wherein the processor is configured to determine that said second condition is true where said predefined type is the value of an HTTP header.

11. A method for determining the vulnerability of computer software applications to attacks, the method comprising:
identifying, by a processor, a defense-related variable within a computer software application that is assigned results of a defense operation, wherein said defense operation is configured to defend against a predefined type of attack;
identifying, by the processor, a control-flow predicate dominating a security-sensitive operation within said computer software application, wherein said security-sensitive operation is security-sensitive with respect to said predefined type of attack;
identifying, by the processor, a data-flow dependent variable defined within instructions of said computer software application that is data-flow dependent on said defense-related variable;

determining, by the processor, that a first condition is true in response to a verification that said control-flow predicate uses said data-flow dependent variable to make a branching decision;

determining that the first condition is false in response to a verification that said control-flow predicate does not use said data-flow dependent variable to make the branching decision;

determining, by the processor, that a second condition is true in response to a verification that a control-flow path leading to said security-sensitive operation is taken only as a result of if said data-flow dependent variable is being compared against a value of a predefined type, that is received from a source external to said computer software application;

determining that the second condition is false in response to a verification that the control-flow path leading to said security-sensitive operation is not taken only as the result of said data-flow dependent variable being compared against the value of the predefined type that is received from the source external to said computer software application;

determining, by the processor, that said security-sensitive operation is safe from said predefined type of attack in response to a verification that both of said conditions are true;

determining, by the processor, that said computer software application is safe from said predefined type of attack in response to a verification that both of said conditions are true for all security-sensitive operations in said computer software application.

12. The method according to claim 11 and further comprising performing said identifying and determining steps wherein said predefined type of attack is a cross-site request forgery attack.

13. The method according to claim 11 wherein said identifying and determining steps are implemented in either of a) computer hardware configured to perform said identifying and determining steps, and b) computer software embodied in a non-transitory computer-readable storage medium.

14. The method according to claim 11 and further comprising providing a notification that said computer software application is safe from said predefined type of attack.

15. The method according to claim 11 and further comprising providing a notification that said computer software application is not safe from said predefined type of attack if determines that fewer than both of said conditions are true regarding said security-sensitive operation.

16. The method according to claim 15 wherein providing a notification comprises identifying said security-sensitive operation regarding which fewer than both of said conditions are true.

17. The method according to claim 11 and further comprising identifying said defense operation within said computer software application.

18. The method according to claim 11 and further comprising identifying said security-sensitive operation within said computer software application.

19. The method according to claim 11 and further comprising determining that said second condition is true where said predefined type is the value of a query string or any part of said query string.

20. The method according to claim 11 and further comprising determining that said second condition is true where said predefined type is the value of an HTTP POST or GET parameter.

21. The method according to claim 11 and further comprising determining that said second condition is true where said predefined type is the value of an HTTP header.

22. A computer program product residing on a non-transitory computer readable storage medium having a plurality of instructions stored thereon which, when executed by a processor, cause the processor to perform operations comprising:

identifying a defense-related variable within a computer software application that is assigned results of a defense operation, wherein said defense operation is configured to defend against a predefined type of attack;

identifying a control-flow predicate dominating a security-sensitive operation within said computer software application, wherein said security-sensitive operation is security-sensitive with respect to said predefined type of attack;

identifying a data-flow dependent variable defined within instructions of said computer software application that is data-flow dependent on said defense-related variable;

determining that a first condition is true in response to a verification that said control-flow predicate uses said data-flow dependent variable to make a branching decision;

determining that the first condition is false in response to a verification that said control-flow predicate does not use said data-flow dependent variable to make the branching decision;

determining that a second condition is true in response to a verification that a control-flow path leading to said security-sensitive operation is taken only as a result of if said data-flow dependent variable is being compared against a value of a predefined type, that is received from a source external to said computer software application;

determining that the second condition is false in response to a verification that the control-flow path leading to said security-sensitive operation is not taken only as the result of said data-flow dependent variable being compared against the value of the predefined type that is received from the source external to said computer software application;

determining that said security-sensitive operation is safe from said predefined type of attack in response to a verification that both of said conditions are true; and determining that said computer software application is safe from said predefined type of attack in response to a verification that both of said conditions are true for all security-sensitive operations in said computer software application.

23. The computer program product according to claim 22 wherein said predefined type of attack is a cross-site request forgery attack.

24. The computer program product according to claim 22 wherein the operations further comprise providing said computer-readable program code is configured to provide a notification that said computer software application is safe from said predefined type of attack.

\* \* \* \* \*